United States Patent
Doh et al.

(10) Patent No.: US 7,681,464 B2
(45) Date of Patent: Mar. 23, 2010

(54) APPARATUS FOR DETECTING THE MOVEMENT OF ITS EMBEDDED ATTACHING MEANS

(75) Inventors: Nakju Doh, Daejeon (KR); Won Pil Yu, Ulsan (KR); Sang Ik Na, Daejeon (KR); Yu-Cheol Lee, Incheon (KR); Hyo-Sung Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 79 days.

(21) Appl. No.: 11/989,609

(22) PCT Filed: Jul. 28, 2006

(86) PCT No.: PCT/KR2006/002969

§ 371 (c)(1),
(2), (4) Date: Jan. 29, 2008

(87) PCT Pub. No.: WO2007/013773

PCT Pub. Date: Feb. 1, 2007

(65) Prior Publication Data

US 2009/0031823 A1   Feb. 5, 2009

(30) Foreign Application Priority Data

Jul. 29, 2005 (KR) ............... 10-2005-0069804
Jul. 27, 2006 (KR) ............... 10-2006-0070839

(51) Int. Cl.
*G01L 1/26* (2006.01)

(52) U.S. Cl. ............................. 73/862.391; 73/826

(58) Field of Classification Search ................
73/862.08–862.391, 862–837, 862.393
See application file for complete search history.

(56) References Cited

U.S. PATENT DOCUMENTS

| | | | | |
|---|---|---|---|---|
| 3,780,440 A | * | 12/1973 | Taylor | 33/756 |
| 3,812,589 A | * | 5/1974 | Schultheis | 33/756 |
| 4,139,197 A | * | 2/1979 | Windall | 473/142 |
| 5,551,545 A | * | 9/1996 | Gelfman | 191/12.2 A |
| 6,157,368 A | | 12/2000 | Fäger | |
| 6,914,403 B2 | | 7/2005 | Tsurumi | |

OTHER PUBLICATIONS

Patent Abstract of Japan, Japanese Publication No. 61-245213, Published Oct. 31, 1986.
Patent Abstract of Japan, Japanese Publication No. 01-281262, Published Nov. 13, 1989.
International Search Report (PCT/ISA/210) mailed Nov. 27, 2006 in connection with the PCT Published Application WO2007/013773A1.

* cited by examiner

*Primary Examiner*—Max Noori
(74) *Attorney, Agent, or Firm*—Staas & Halsey LLP

(57) ABSTRACT

Provided is an apparatus for detecting the tension, moving direction, and length of a connector. The detecting apparatus includes a connector including one end connected inside the movement detecting apparatus and other end disposed at an outer side of the movement detecting apparatus, a tension detector measuring a tension force applied to the connector by detecting a minute change in a parameter of the tension detector when the other end of the connector is pulled away from the movement detecting apparatus, a direction detector measuring a movement of the connector in horizontal and vertical directions in a plane substantially perpendicular to the tension so as to detect a direction of the tension force applied to the connector, and a length detector detecting a length of the connector extended from the movement detecting apparatus by the tension force applied to the connector. When the connector such as a cable is pulled, the detecting apparatus detects information about the pulling conditions of the cable. Therefore, when a user walks with a dog robot by holding the cable of the detecting apparatus attached to the dog robot, the detecting apparatus provides information about the cable-holding conditions to inform the dog robot of user's intention, so that the dog robot can follow the user according to the user's intention. Thus, automatically-movable devices such as the dog robot can be conveniently used by employing the detecting apparatus since the detecting apparatus provides information about user's intention to the devices.

12 Claims, 7 Drawing Sheets

APPARATUS FOR DETECTING THE MOVEMENT OF ITS EMBEDDED ATTACHING MEANS

CROSS-REFERENCE TO RELATED PATENT APPLICATION

This application claims the benefit under 35 U.S.C. Section 371, of PCT International Application Number PCT/KR2006/002969, filed Jul. 28, 2006 and Korean Patent Application Nos. 10-2005-0069804, filed on Jul. 29, 2005 and No. 10-2006-0070839, filed on Jul. 27, 2006 in Korean, the contents of which are incorporated herein by reference.

BACKGROUND OF THE INVENTION

1. Field of the Invention

The present invention relates to automatic control, and more particularly, to an apparatus for detecting the tension, direction, and length of a connector.

2. Description of the Related Art

Various automatic devices such as dog robots have been developed. However, for example, the movement of the dog robot is limited although the dog robot can move in consideration of its surrounding conditions. For instance, information about a user's movement such as direction and speed should be provided to the dog robot to make the dog robot follow the user in the same way as a real dog. However, it is difficult to get such information. Therefore, a user cannot walk with a dog robot while guiding the dog robot in a desired direction using a connector such as a leash.

SUMMARY OF THE INVENTION

The present invention provides an apparatus for detecting the tension, moving direction, and length of a connector such as a cable or a rope.

According to an aspect of the present invention, there is provided a movement detecting apparatus comprising: a connector having one end connected inside the movement detecting apparatus and other end disposed at an outer side of the movement detecting apparatus; and a length detector detecting an extension length of the connector from the movement detecting apparatus.

According to another aspect of the present invention, there is provided a movement detecting apparatus further comprising: a connector including one end connected inside the movement detecting apparatus and other end disposed at an outer side of the movement detecting apparatus; and a direction detector measuring a movement of the connector in horizontal and vertical directions in a plane substantially perpendicular to a tension force applied to the connector so as to detect a direction of the tension force applied to the connector.

According to another aspect of the present invention, there is provided a movement detecting apparatus further comprising: a connector including one end connected to inside the movement detecting apparatus and other end disposed at an outer side of the movement detecting apparatus; and a tension detector measuring a tension force applied to the connector by detecting a minute change in a parameter of the tension detector when the other end of the connector is pulled away from the movement detecting apparatus.

According to another aspect of the present invention, there is provided a movement detecting apparatus further comprising: a connector including one end connected inside the movement detecting apparatus and other end disposed at an outer side of the movement detecting apparatus; a tension detector measuring a tension force applied to the connector by detecting a minute change in a parameter of the tension detector when the other end of the connector is pulled away from the movement detecting apparatus; a direction detector measuring a movement of the connector in horizontal and vertical directions in a plane substantially perpendicular to the tension force so as to detect a direction of the tension force applied to the connector; and a length detector detecting a length of the connector extended from the movement detecting apparatus by the tension force applied to the connector.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
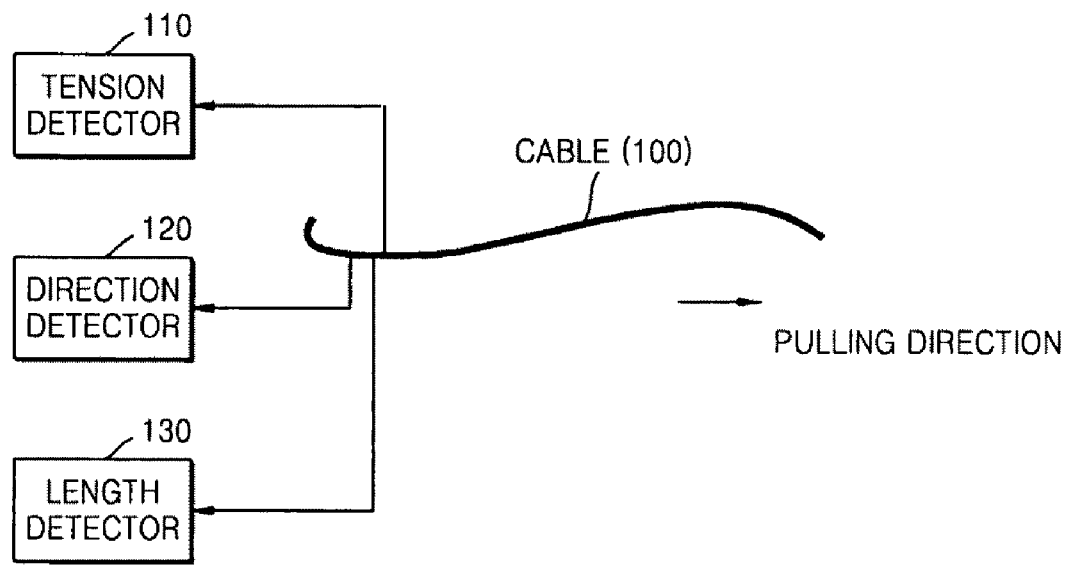
FIG. 1 is a schematic view illustrating an apparatus for detecting the tension, moving direction, and length of a connector according to an embodiment of the present invention.

FIG. 1 is a schematic view illustrating an apparatus for detecting the tension, moving direction, and length of a connector according to an embodiment of the present invention. In the following description, a flexible cable is described as an example of the connector. However, the present invention is not limited to the flexible cable. The present invention can be applied to various connectors.

The detecting apparatus includes a cable 100, a tension detector 110, a direction detector 120, and a length detector 130. One end of the cable 100 is connected inside the detecting apparatus, and other end of the cable 100 is disposed at an outer side of the detecting apparatus. For example, the cable 100 may extend from the detecting apparatus through a hole or opening formed therein. The tension detector 110 measures the tension of the cable 100. For example, when the other end of the cable 100 is pulled, the tension detector 110 detects even a slight change in the tension of the cable 100. The direction detector 120 detects the direction of the cable 100 when the cable is stretched by detecting the movement of the cable 100 on a plane perpendicular to the direction of a tension force acting on the cable 100. The length detector 130 measures the stretched length of the cable 100 from the detecting apparatus.

FIG. 1 is a schematic block diagram of the detecting apparatus.

Figure 2:
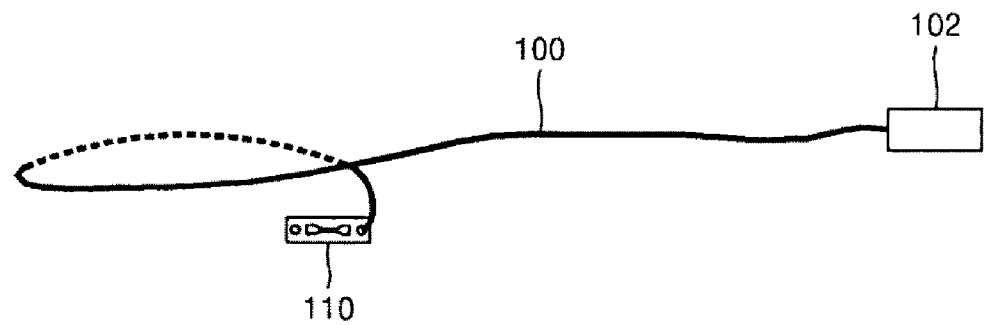
FIG. 2 is a view illustrating a cable as an example of a connector according to an embodiment of the present invention.

FIG. 2 is a view illustrating the cable 100 as an example of the connector of the detecting apparatus according to an embodiment of the present invention. The cable 100 can be formed of a flexible material.

As explained above, one end of the cable 100 is connected inside the detecting apparatus. For this, the end of the cable 100 is connected to the tension detector 110 in the embodiment shown in FIG. 2. The other end of the cable 100 is provided with a grip 102, such that a user can easily pull the cable 100 to move the detecting apparatus by using the grip 102.

A winding unit such as a reel (or roller) is installed in the detecting apparatus at a location near the cable 100 coupled to the tension detector 110. The cable 100 can be automatically wound around the reel. The reel will be described later in more detail.

When the cable 100 is not pulled by a user (e.g., when the cable is completely wound around the reel), substantially no tension force is applied to the cable 100. Thus, in this case, the cable 100 may have a normal length (free length). Meanwhile, when the cable 100 is pulled by a user (e.g., when the cable is partially or fully extend from the reel), the user may perceive a tension force acting on the cable 100 by a winding mechanism of the reel. The detecting apparatus of the present invention automatically measures the tension and moving direction of the cable 100 when the cable 100 is pulled.

When the user releases the cable 100, the cable 100 is rewound onto the reel, and thus returns to its normal length.

Figure 3:
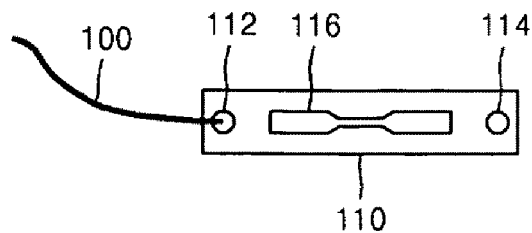
FIG. 3 illustrates a cable and a tension detector that are coupled to each other according to an embodiment of the present invention.

FIG. 3 illustrates the cable 100 and the tension detector 110 that are coupled to each other according to an embodiment of the present invention. The tension detector 110 includes a cable portion 112 connected to the cable 100, a coupling portion 114 to be coupled to the reel disposed inside the detecting apparatus by a fastener such as a screw so as to connect the cable 100 to the inside of the detecting apparatus, and a tension gauge 116 measuring the tension of the cable 100 by detecting a change in the length of the tension detector 120 when the cable 100 is pulled from the reel.

The tension gauge 116 may include a strain gauge.

The strain gauge is also called an extensometer. The strain gauge is used to measure a change in the distance between two given points of a deforming solid body (i.e., the strain of the deformed solid body).

The strain gauge can be provided in various forms, such as mechanical, optical, electrical resistance, and sonic type strain gauges. The types and characteristics of the strain gauge are well known to those of skill in the related art. Thus, a detailed description of the strain gauge will be omitted.

A tension of the cable 100 caused by a pulling force is measured by the strain gauge.

The direction detector 120 detects the direction of the cable 100. The direction detector 120 may be a passive direction detector or an active direction detector. A detailed description of the direction detector 120 is given with reference to FIGS. 4A through 4D.

Figure 4A:
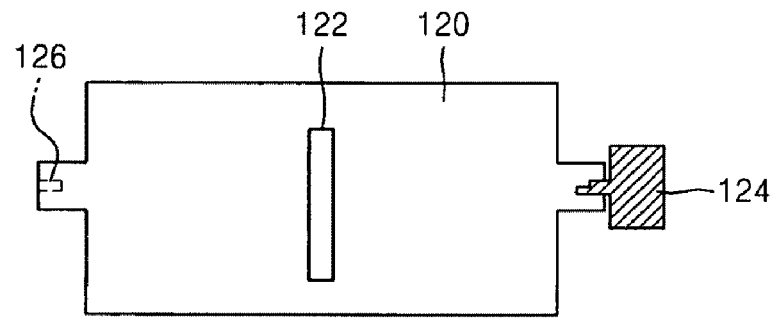
FIGS. 4A and 4B are a plan view and a side view illustrating a passive direction detector according to an embodiment of the present invention.
Figure 4B:
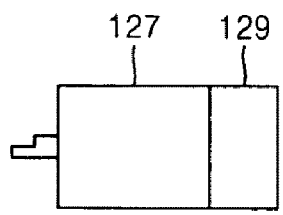

FIGS. 4A and 4B are a plan view and a side view illustrating a passive direction detector 120 according to an embodiment of the present invention.

Referring to FIG. 4A, the passive direction detector 120 includes a movable part 122 accommodating the cable 100 and allowing the cable 100 to slide according to a tension force, a variable resistance part 124 connected to the movable part 122 and having a resistance varying according to the movement of the cable 100, and a detecting part (not shown) detecting the stretched length of the cable 100 using a resistance value of the variable resistance part 124.

Referring to FIG. 4B, the direction detector 120 can be rotated in the direction of arrow. The cable 100 passes through the movable part 122, and the variable resistance part 124 measures the amount of rotation of the movable part 122 caused by movement of the cable 100. A screw hole 126 is formed in the direction detector 120 to receive a screw to rotatably fix the direction detector 120 to a body of the detecting apparatus. The screw functions as a rotation axle of the direction detector 120. The detecting part is now shown in FIG. 4B.

Figure 4C:
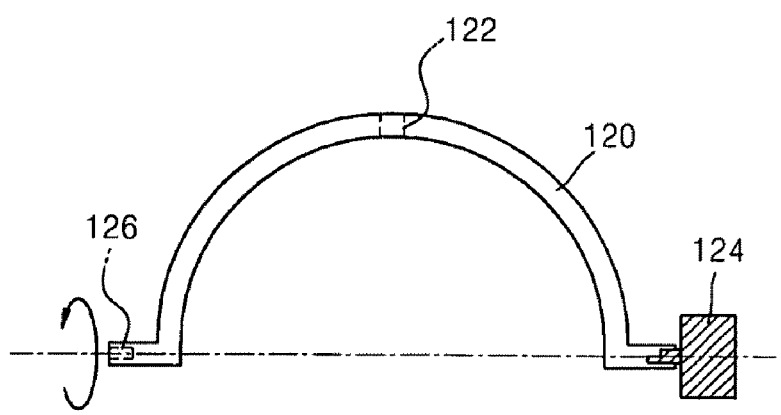
FIG. 4C illustrates some parts of an active direction detector according to an embodiment of the present invention.

FIG. 4C illustrates some parts of an active direction detector according to an embodiment of the present invention.

Referring to FIG. 4C, the active direction detector includes a motor 127 and an encoder 129 measuring the rotation angle of the motor 124. The motor 127 and the encoder 129 correspond to the variable resistance part 124 of the passive direction detector 120 illustrated in FIGS. 4A and 4B. The motor 127 rotates in the reverse direction of the arrow shown in FIG. 4B to apply a tension force to the cable 100. The encoder 129 measures the rotation angle of the motor 127 to detect a current moving direction of the cable 100.

A tension force applied to the cable 100 by the motor 127 is transmitted to a user holding the grip 102 of the cable 100. For example, when a user instructs a robot to move to a location where the robot cannot approach, the robot can inform the user that the location is unapproachable by pulling the cable 100 using the active direction detector. In this way, the user can be informed of the state of the robot. Thus, the user can manipulate the robot more stably and conveniently.

Figure 4D:
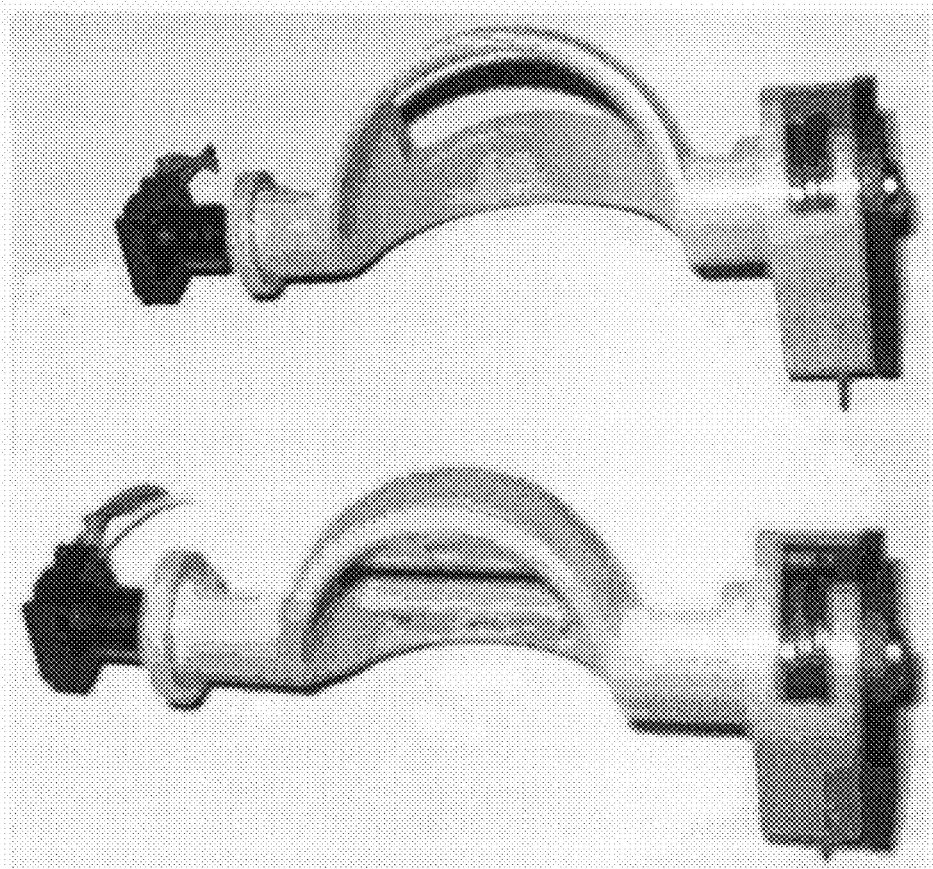
FIG. 4D shows images of assembled parts of a direction detector according to an embodiment of the present invention.

FIG. 4D shows images of assembled parts of a direction detector according to an embodiment of the present invention.

Figure 5:
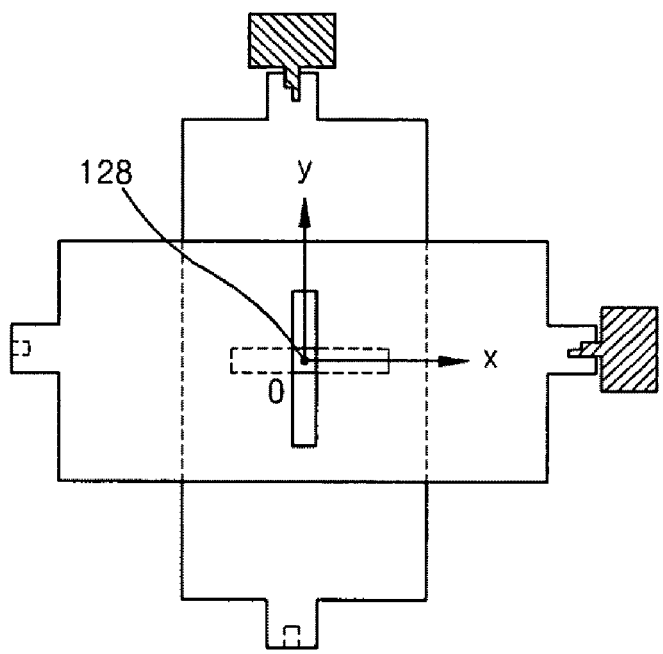
FIG. 5 illustrates two direction detectors combined to measure the movement of a cable in x-axis and y-axis directions according to an embodiment of the present invention.

FIG. 5 illustrates two direction detectors combined to measure the movement of a cable in x-axis and y-axis directions according to an embodiment of the present invention.

Referring to FIG. 5, two direction detectors having the same structure as the direction detector illustrated in FIGS. 4A and 4B or FIG. 4C are combined in such a manner that the two direction detectors cross at right angles with their movable parts 122 being located centrally. With this configuration, the movement of a cable can be measured both in the x-axis and y-axis directions. Here, an origin 128 can be defined in the center of slots of the movable parts 122. The cable passes through the intersection area of the movable parts 122.

When the two direction detectors are configured using the passive direction detector illustrated in FIGS. 4A and 4B, variable resistance parts 124 of the direction detectors are used to measure the movement of a cable in the x-axis and y-axis directions, respectively. Similarly, when the two direction detectors are configured using the active direction detector illustrated in FIG. 4C, a motor 127 and an encoder 129 of one direction detector is used to measure the movement of a cable in the x-axis direction, and a motor 127 and an encoder 129 of the other direction detector is used to measure the movement of the cable in the y-axis direction.

Figure 6:
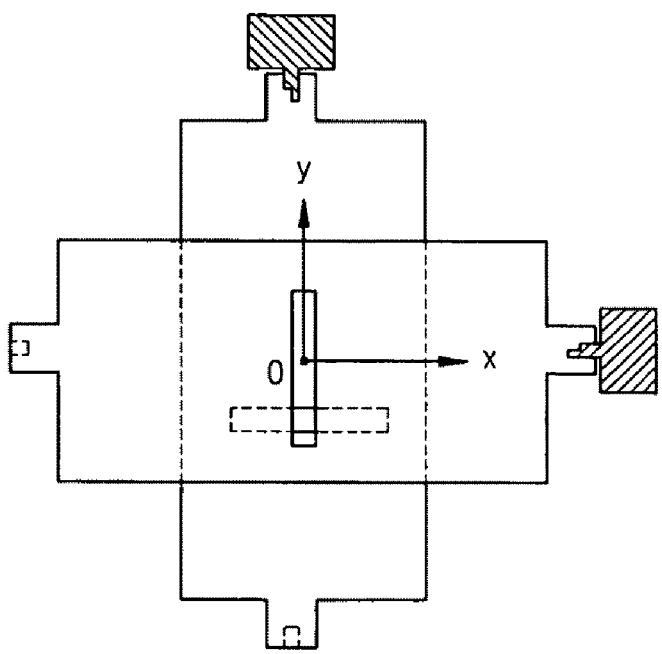
FIG. 6 illustrates the two direction detectors of FIG. 5 when a cable passing through the two direction detectors is moved in a negative direction of the y-axis according to an embodiment of the present invention.

FIG. 6 illustrates the two direction detectors of FIG. 5 when a cable passing through the two direction detectors is moved in a negative direction of the y-axis.

When the two direction detectors are configured using the passive direction detector illustrated in FIGS. 4A and 4B, the variable resistance part 124 of one of the direction detectors may be a horizontal variable resistance part that has a resistance varying according to the x-axis component in the movement direction of the cable, and the variable resistance 124 of the other direction detector may be a vertical variable resistance part that has a resistance varying according to the y-axis component in the movement direction of the cable. When the cable is pulled, a detecting part of the direction detectors may measure the direction of the pulled cable using resistance values of the horizontal and vertical variable resistance parts 124.

In other words, when the cable is pulled, the movable parts 122 of the direction detectors are moved according to the movement of the cable, and the x-axis and y-axis components in the movement direction of the cable parts 122 are measured according to the corresponding variable resistance value. Then, the detecting part measures the direction of the pulled cable using the resistance values of the variable resistance parts 124.

Figure 7A:
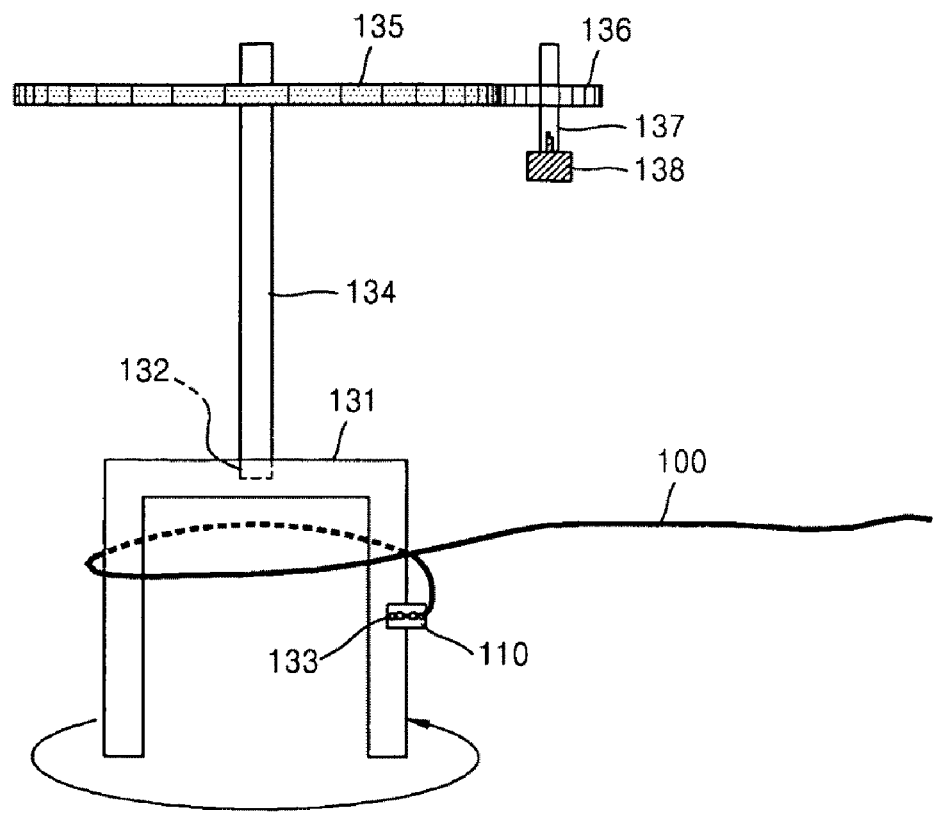
FIG. 7A illustrates a passive length detector according to an embodiment of the present invention.

FIG. 7A illustrates a passive length detector according to an embodiment of the present invention.

The passive length detector includes a reel 131 and a rotation gauge. An end of a cable 100 is connected to a tension detector 100 that is fitted into a mounting hole 133 of the reel 131, and the cable 100 is wound around the reel 131. When the cable 100 is pulled out, the rotation gauge measures the rotation angle of the reel 131, such that the length of the cable 100 pulled from the reel 131 can be detected. The rotation gauge can be configured as follows.

The rotation gauge includes a first gear 135, a second gear 136, a variable resistance part 138, and an extended length detection part (not shown). The first and second gears 135 and 136 are connected to the reel 131 through a shaft 134 attached to a hole 132 of the reel 131, such that the first and second gears 135 and 136 can rotate according to the rotation of the reel 131. The variable resistance part 138 is connected to the second gear 136 through a shaft 137 of the second gear 136 and has a resistance that varies according to the rotation of the second gear 136. When the cable 100 is pulled out from the reel 131, the extension length detection part measures the length of the cable 100 pulled from the reel 131 by measuring the rotation angle of the reel 131 using the resistance the variable resistance part 138.

In detail, when the cable 100 is pulled out from the reel 131, the reel 131 is rotated in the direction of the arrow in FIG. 7A. As a result, the first gear 135 connected to the reel 131 through the shaft 134 is rotated, and the second gear 136 engaged with the first gear 135 is rotated. The rotation of the second gear 136 changes the resistance of the variable resistance part 138. The extension length detection part can determine the length of the cable 100 pulled from the reel 131 by using the variation of the resistance of the variable resistance part 138. For this, an initial resistance of the variable resistance part 138 may be previously measured and stored.

The first and second gears 135 and 137 are used to match the resistance variation range of the variable resistance part 138 with the allowable rotation angle of the reel 131. Thus, the gear ratio of the first and second gears 135 and 137 may be determined by the characteristics the variable resistance part 138 and the reel 131.

For example, when the allowable rotation angle of the reel 131 is small, only one gear can be used between the reel 131 and the variable resistance part 138. Further, as shown in FIG. 7A, when the allowable rotation angle of the reel 131 is large, two gears can be used between the reel 131 and the variable resistance part 138 to adjust the rotation of the variable resistance part 138.

Figure 7B:
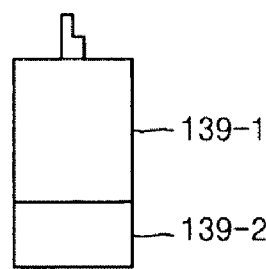
FIG. 7B illustrates some parts of an active length detector according to an embodiment of the present invention.

FIG. 7B illustrates some parts of an active length detector according to an embodiment of the present invention.

The active length detector includes a motor 139-1 and an encoder 139-2 measuring the rotation angle of the motor 139-1. The motor 139-1 and the encoder 139-2 respectively correspond to the variable resistance part 138 of the passive length detector illustrated in FIG. 7A. The cable 100 can be wound around the reel 131 or released from the reel 131 by rotating the motor 139-1, and the length of the cable 100 extending from the reel 131 can be detected by measuring the rotation angle of the motor 139-1 using the encoder 139-2.

In detail, power is transmitted from the motor 139-1 to the reel 131 through the first and second gears 135 and 136, and thus a force is applied to the cable 100. This force may be transmitted to a user holding a free end of the cable 100. For example, when a user instructs a robot to move to a location where the robot cannot approach, the robot can inform the user that the location is unapproachable by applying a force to the cable 100 using the active length detector. In this way, the user can be informed of the state of the robot. Thus, the user can manipulate the robot more stably and conveniently.

Figure 8A:
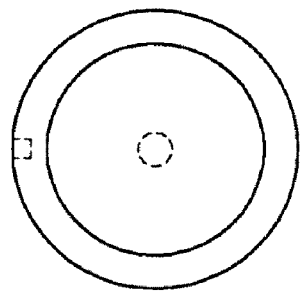
FIGS. 8A and 8B are a plan view and a side view illustrating a reel according to an embodiment of the present invention.
Figure 8B:
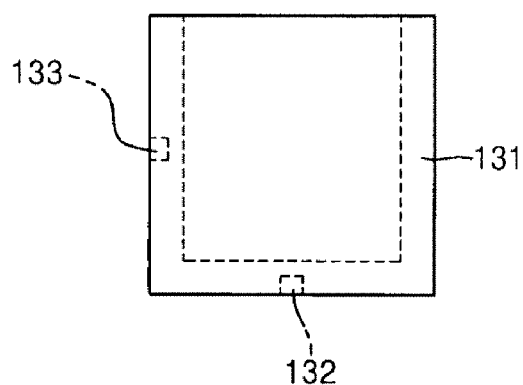

FIGS. 8A and 8B are a plan view and a side view illustrating a reel 131 according to an embodiment of the present invention.

Figure 9:
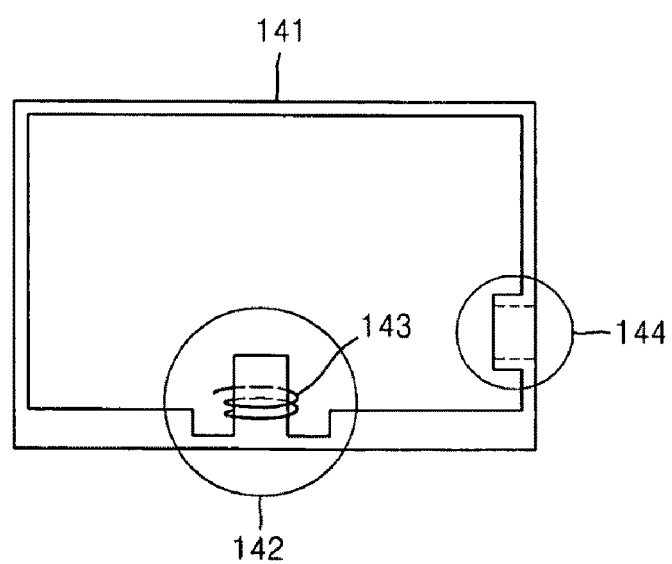
FIG. 9 is a cross-sectional view illustrating an outer case into which an apparatus for detecting the tension, moving direction, and length of a cable can be assembled according to an embodiment of the present invention.

FIG. 9 is a cross-sectional view illustrating an outer case into which the apparatus for detecting the tension, moving direction, and length of a cable can be assembled according to an embodiment of the present invention.

The outer case includes a body 141, a rotary part receiving portion 142, and an opening 144. The rotary part receiving portion 142 includes a coil spring 143 and receives the reel 131. A cable 100 passes through the opening 144, and the moving direction detector 120 is disposed at the opening 144. Other parts of the detecting apparatus can be accommodated inside the outer case.

The reel 131 is connected to the coil spring 143. Thus, when the cable 100 is pulled out and then released, the cable 100 can be automatically wound around the reel 131. In other words, the coil spring 143 can function as a rotating axle of the reel 131.

Figure 10:
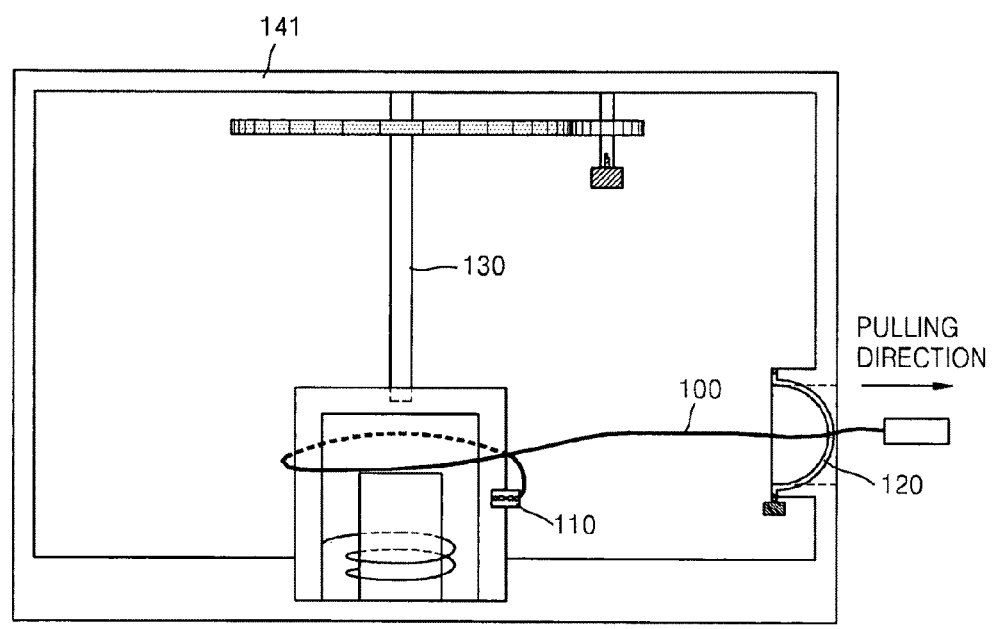
FIG. 10 is an assembled view illustrating an apparatus for detecting the tension, moving direction, and length of a cable according to an embodiment of the present invention.

FIG. 10 is an assembled view illustrating an apparatus for detecting the tension, moving direction, and length of a cable according to an embodiment of the present invention.

In FIG. 10, a cable 100, a tension detector 110, a direction detector 120, and a length detector 130, and a body 141 of an outer case are illustrated using reference numerals, while other parts of the detecting apparatus are not labeled for clarity. However, if necessary, the non-labeled parts are described using like reference numerals used in FIGS. 2 through 9.

For example, the direction detector 120 has a movable part 122 having a semi-spherical shape, and the cable 100 passes through a center portion of the movable part 122. When the cable 100 is moved, the movable part 122 is also moved according to the movement of the cable 100, and thus the direction of a pulling force of the cable 100 can be detected from the movement of the movable part 122. The diameter of the semi-spherical movable part 122 is larger than an opening 144 (refer to FIG. 9).

Although only a vertically-mounted direction detector 120 is shown in FIG. 10, a horizontally-mounted direction detector 120 can be further mounted on the body 141 of the outer case in combination with the vertically-mounted direction detector 120, like the embodiment illustrated in FIG. 5.

When the cable 100 is pulled out, the reel 131 is rotated and thus the cable 100 can extend outward. Here, a tension force applied to the cable 100 is detected by the tension detector 110. Further, the movement of the cable 100 in a plane perpendicular to the tension force is detected in horizontal and vertical directions by the direction detector 120, so that the direction of the tension force applied to the cable 100 can be measured. Furthermore, the extended length of the cable 100 can be measured by detecting the rotation angle of the reel 131 using the length detector 130.

The detecting apparatus according to the present invention can be attached to mobile devices having wheels or legs. For example, the detecting apparatus can be attached to a robot. In this case, when a user pulls the cable of the detecting apparatus using the handle attached to an end of the cable, the tension, moving direction, and extension length of the cable are automatically measured and sent to the robot to inform the robot of the users' intention. Thus, the robot can automatically move according to the users' intention. For example, when the user holding the handle of the cable moves fast, a larger tension force is applied to the cable and thus the cable extends much more. This situation can be informed of the robot by the detecting apparatus of the present invention, and thus the robot can recognize that the user moves fast and automatically keep in step with the user.

For example, when the detecting apparatus of the present invention is attached to a dog robot, a user could walk with the dog robot using the cable of the detecting apparatus as if the user were walking with a real dog.

For example, when the detecting apparatus of the present invention is attached to an automatically-movable toolbox, a user can adjust the speed and direction of the (heavy) tool box using the cable of the detecting apparatus.

As described above, the detecting apparatus includes: a connector including one end connected inside the detecting apparatus and the other end disposed at an outer side of the detecting apparatus; a tension detector measuring a tension force applied to the connector by detecting a minute change in a parameter of the tension detector when the other end of the connector is pulled away from the detecting apparatus; a direction detector detecting a movement of the connector in horizontal and vertical directions in a plane substantially perpendicular to the tension so as to detect a direction of the tension force applied to the connector; and a length detector detecting a length of the connector extended from the movement detecting apparatus by the tension force applied to the connector. When the connector such as a cable is pulled, the detecting apparatus detects information about pulling conditions of the cable. Therefore, when a user walks with a dog robot by holding the cable of the detecting apparatus which is attached to the dog robot, the detecting apparatus provides information about cable-holding conditions to inform the dog robot of user's intention, so that the dog robot can follow the user according to the user's intention. Thus, automatically-movable devices such as the dog robot can be conveniently used by employing the detecting apparatus since the detecting apparatus provides information about user's intention.

As described above, the detecting apparatus includes a connector including one end connected inside the detecting apparatus and the other end disposed at an outer side of the detecting apparatus, a tension detector measuring a tension force applied to the connector by detecting a minute change in a parameter of the tension detector when the other end of the connector is pulled away from the detecting apparatus, a direction detector detecting a movement of the connector in horizontal and vertical directions in a plane substantially perpendicular to the tension so as to detect a direction of the tension force applied to the connector, and a length detector detecting a length of the connector extended from the movement detecting apparatus by the tension force applied to the connector. When the connector such as a cable is pulled, the detecting apparatus detects information about pulling conditions of the cable. Therefore, when a user walks with a dog robot by holding the cable of the detecting apparatus which is attached to the dog robot, the detecting apparatus provides information about cable-holding conditions to inform the dog robot of user's intention, so that the dog robot can follow the user according to the user's intention. Thus, automatically-movable devices such as the dog robot can be conveniently used by employing the detecting apparatus since the detecting apparatus provides information about user's intention.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A movement detecting apparatus, comprising:
a connector including one end connected inside the movement detecting apparatus and other end disposed at an outer side of the movement detecting apparatus; and
a length detector detecting an extension length of the connector from the movement detecting apparatus,
wherein the length detector comprises:
a reel connected to the end of the connector and used for winding the connector; and
a rotation gauge detecting an extension length of the connector by measuring a rotation angle of the reel when the connector is pulled, and
wherein the rotation gauge comprises:
a gear connected to the reel and rotating according to a rotation of the reel;
a variable resistance part connected to the gear and having a resistance that varies according to the rotation of the gear; and
an extension length detection part detecting an extension length of the connector by measuring the rotation angle of the gear using the resistance of the variable resistance part.

2. A movement detecting apparatus, comprising:
a connector including one end connected inside the movement detecting apparatus and other end disposed at an outer side of the movement detecting apparatus; and
a length detector detecting an extension length of the connector from the movement detecting apparatus,
wherein the length detector comprises:
a reel connected to the end of the connector and used for winding the connector; and
a rotation gauge detecting an extension length of the connector by measuring a rotation angle of the reel when the connector is pulled, and wherein the rotation gauge comprises:
a gear connected to the reel and rotating according to a rotation of the reel;
a motor connected to the gear and rotating the gear; and
an encoder detecting an extension length of the connector by measuring a rotation angle of the motor.

3. A movement detecting apparatus comprising:
a connector including one end connected inside the movement detecting apparatus and other end disposed at an outer side of the movement detecting apparatus;
a length detector detecting an extension length of the connector from the movement detecting apparatus by measuring a rotation angle; and
a direction detector detecting a moving direction of the connector in horizontal and vertical directions in a plane substantially perpendicular to a tension force applied to the connector so as to detect a direction of the tension force applied to the connector.

4. A movement detecting apparatus comprising:
a connector including one end connected inside the movement detecting apparatus and other end disposed at an outer side of the movement detecting apparatus;
a length detector detecting an extension length of the connector from the movement detecting apparatus by measuring a rotation angle; and
a tension detector measuring a tension force applied to the connector by detecting a minute change in a parameter of the tension detector when the other end of the connector is pulled away from the movement detecting apparatus.

5. A movement detecting apparatus comprising:
a connector including one end connected inside the movement detecting apparatus and other end disposed at an outer side of the movement detecting apparatus; and
a direction detector detecting a moving direction of the connector in horizontal and vertical directions in a plane substantially perpendicular to a tension force applied to the connector so as to detect a direction of the tension force applied to the connector.

6. A movement detecting apparatus, comprising:
a connector including one end connected inside the movement detecting apparatus and other end disposed at an outer side of the movement detecting apparatus; and
a direction detector detecting a moving direction of the connector in horizontal and vertical directions in a plane substantially perpendicular to a tension force applied to the connector so as to detect a direction of the tension force applied to the connector, and
wherein the direction detector comprises:
a movable part including a slot through which the connector runs out of the movement detecting apparatus, the slot allowing a movement of the connector along the slot when a tension force is applied to the connector;
a variable resistance part connected to the movable part and having a resistance that varies according to a movement of the movable part caused by a movement of the connector; and
a detecting part detecting a direction of the tension force applied to the connector using a resistance value of the variable resistance part.

7. The movement detecting apparatus of claim 6, wherein the variable resistance part comprises:
a horizontal variable resistance part having a resistance that varies according to the x-axis component in the movement direction of the movable part; and
a vertical variable resistance part having a resistance that varies according to the y-axis component in the movement direction of the movable part in an y-axis direction,
wherein the detecting part detects the direction of the tension force applied to the connector using resistance values of the horizontal and vertical variable resistance parts.

8. A movement detecting apparatus, comprising:
a connector including one end connected inside the movement detecting apparatus and other end disposed at an outer side of the movement detecting apparatus;
a direction detector detecting a moving direction of the connector in horizontal and vertical directions in a plane substantially perpendicular to a tension force applied to the connector so as to detect a direction of the tension force applied to the connector;
a movable part including a slot through which the connector runs out of the movement detecting apparatus, the slot allowing a movement of the connector along the slot when a tension force is applied to the connector;
a motor applying a force to the connector; and
an encoder detecting a direction of a pulling force applied to the connector by measuring a rotation angle of the motor.

9. The movement detecting apparatus of claim 5, further comprising a tension detector measuring a tension force applied to the connector by detecting a minute change in a parameter of the tension detector when the other end of the connector is pulled away from the movement detecting apparatus.

10. A movement detecting apparatus comprising:
a connector including one end connected inside the movement detecting apparatus and other end disposed at an outer side of the movement detecting apparatus; and
a tension detector measuring a tension force applied to the connector by detecting a minute change in a parameter of the tension detector when the other end of the connector is pulled away from the movement detecting apparatus, and
wherein the connector is connected inside the movement detecting apparatus via a winding unit, and the tension detector includes:
a connector portion connected to the connector;
a coupling portion connected to the winding unit; and
a tension gauge measuring a tension force applied to the connector by detecting a change in a length of the tension detector when the connector is pulled from the winding unit.

11. A movement detecting apparatus comprising:
a connector including one end connected inside the movement detecting apparatus and other end disposed at an outer side of the movement detecting apparatus; and
a tension detector measuring a tension force applied to the connector by detecting a minute change in a parameter of the tension detector when the other end of the connector is pulled away from the movement detecting apparatus, and
wherein the tension gauge comprises a strain gauge.

12. A movement detecting apparatus comprising:
a connector including one end connected inside the movement detecting apparatus and other end disposed at an outer side of the movement detecting apparatus;
a tension detector measuring a tension force applied to the connector by detecting a minute change in a parameter of the tension detector when other end of the connector is pulled away from the movement detecting apparatus;

a direction detector detecting a moving direction of the connector in horizontal and vertical directions in a plane substantially perpendicular to the tension so as to detect a direction of the tension force applied to the connector; and a length detector detecting a length of the connector extended from the movement detecting apparatus by the tension force applied to the connector.

\* \* \* \* \*